(12) United States Patent
Czarnecki

(10) Patent No.: US 7,737,579 B1
(45) Date of Patent: Jun. 15, 2010

(54) COMMON NEUTRAL FOR LOAD-SIDE SEPARATELY-DERIVED TRANSFER SWITCH

(75) Inventor: Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 70 days.

(21) Appl. No.: 12/057,954

(22) Filed: Mar. 28, 2008

(51) Int. Cl.
   *H02J 7/00* (2006.01)
(52) U.S. Cl. ....................................................... 307/64
(58) Field of Classification Search .................... 307/64
   See application file for complete search history.

(56) References Cited

U.S. PATENT DOCUMENTS

| 3,936,782 A | * | 2/1976 | Moakler et al. ............. 335/161 |
| 4,021,678 A | | 5/1977 | Moakler et al. |
| 5,070,252 A | | 12/1991 | Castenschiold et al. |
| 7,462,791 B1 | * | 12/2008 | Flegel ..................... 200/50.32 |
| 2006/0138868 A1 | | 6/2006 | Wareham et al. |

\* cited by examiner

*Primary Examiner*—Robert L. DeBeradinis
(74) *Attorney, Agent, or Firm*—Boyle Fredrickson, S.C.

(57) ABSTRACT

A separately-derived, load-side transfer switch connected to the neutral leads of a load center in a single and switchable connection, which allows for connection and disconnection of the load center neutrals to a primary or an auxiliary power source in a single manual operation.

15 Claims, 4 Drawing Sheets

FIG. 2 -- PRIOR ART --

COMMON NEUTRAL FOR LOAD-SIDE SEPARATELY-DERIVED TRANSFER SWITCH

BACKGROUND OF THE INVENTION

This invention relates to a transfer switch of the type that is adapted to be interconnected with an auxiliary power source, such as an electrical generator, for controlling the supply of electrical power from the generator to branch electrical circuits in an electrical load center. More particularly, the invention relates to a transfer switch that connects the neutrals of a load center in a single and switchable connection thereby allowing connection and disconnection of the load center neutrals to a primary power source or an auxiliary power source in a single operation.

A building, such as a home or other dwelling, will present critical and non-critical loads to the primary power source of the building, which is generally a utility power supply. The critical loads for a home, for instance, may include the HVAC system, sump pump, refrigerators, freezers, dishwasher, washer/dryer, and life-sustaining medical equipment. All other loads of the home will generally be considered non-critical. The non-critical loads are generally connected to non-critical branches that are hardwired to a load center and the critical loads may be connected to critical branches that are hardwired to a separate subpanel; both of which are powered by the primary power source during normal primary power source operation.

To ensure power to the critical loads during primary power source failure, it is known to connect the subpanel and, thus, the critical loads, to an auxiliary power source, such as electrical generator using a transfer switch. The majority of prior art transfer switches are manually operated. With transfer switches of this type, the operator initiates operation of an auxiliary power source, such as an electric generator, and connects the auxiliary power source to the transfer switch, unless there is a permanent connection between the generator and the transfer switch. The individual switches or circuit breakers of the transfer switch are then actuated to supply power from the generator to the circuits in which the individual transfer switches are connected.

As shown in FIG. 1, a conventional manual transfer switch 10 is operative to selectively connect a series of loads 12 between a primary power source 14 and an auxiliary power source 16. In the illustrated example, the manual transfer switch 10 is a four-circuit, load-side, non-separately-derived transfer switch. In this regard, the manual transfer switch 10 services four loads, represented by resistors R1, R2, R3, and R4 and performs any switching of the loads 12 between the primary and auxiliary power sources 14, 16 using hot switches 18 after utility breakers 20 and distribution breakers 22. As evident in the schematic, the primary power source 14 includes two hot lines 24, 26 and a neutral line 28 and the auxiliary power source 16 similarly includes two hot lines 30, 32 and a neutral line 34. As further illustrated in the schematic, the neutral lines 28, 34 are permanently connected to, rather than switched between, the primary power source 14 and the auxiliary power source 16. Because of this permanent connection, the manual transfer switch 10 could not be used in a separately-derived, load-side manner, as may be desired.

Because of this desirability to have a separately-derived configuration, one proposed solution to the drawbacks presented by a non-separately-derived, load-side transfer switch, such as that shown in FIG. 1, is a transfer switch in which a neutral switch is used for each hot switch, as shown in FIG. 2. In this example, transfer switch 10 includes two hot switches 18 and two neutral switches 36 to selectively connect neutral wires 28, 34 of the primary power and auxiliary power sources 14, 16, respectively, to loads 12.

In the proposed solution shown in FIG. 2, the number of hot switches 18 is effectively reduced by one-half to account for the neutral switches 36. That is, if the transfer switch 10 is configured to have four switches, two of those switches are used as hot switches 18 and the remaining two switches are used as neutral switches 36. Alternately, the transfer switch 10 may be constructed to have a total of eight switches to provide the same number of hot switches 18 provided by the transfer switch 10 illustrated in FIG. 1. Doubling the number of switches effectively increases the size, wiring complexity, and cost of the transfer switch.

BRIEF DESCRIPTION OF THE INVENTION

The present invention is directed to transfer switch having a separately-derived load-side arrangement. The transfer switch is adapted to be interposed between an auxiliary power source, such as a generator, and an electrical load center which is interconnected with a primary power source, such as utility power. The electrical load center includes a series of branch electrical circuits, each of which is connected with an electrical load. The transfer switch arrangement includes a series of switches, each of which is interconnected between the auxiliary power source and one of the branch circuits. The switches are normally in a first contact position in which the branch circuit is supplied with power from the primary power source. Upon actuation, each switch is movable to a second contact position in which the branch circuit is connected to the auxiliary power source.

In one embodiment, the neutral leads of the electrical load center are collected and tied together in a single connection. A single dedicated neutral switch is then used to switch all the connected neutral leads to either the auxiliary or primary power sources in a single operation.

In another embodiment, a transfer switch is constructed to control power delivery to N loads, wherein each load has a hot line and a neutral line, using less than 2N switches to selectively connect the loads to a primary power source or an auxiliary power source.

In yet another embodiment, a transfer switch is constructed to have N+1 switches to selectively connect N loads to a primary power source or an auxiliary power source.

The invention contemplates a transfer switch arrangement as described above, as well as a method of supplying electrical power to a series of electrical loads upon a disruption in a primary source of electrical power, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 3:
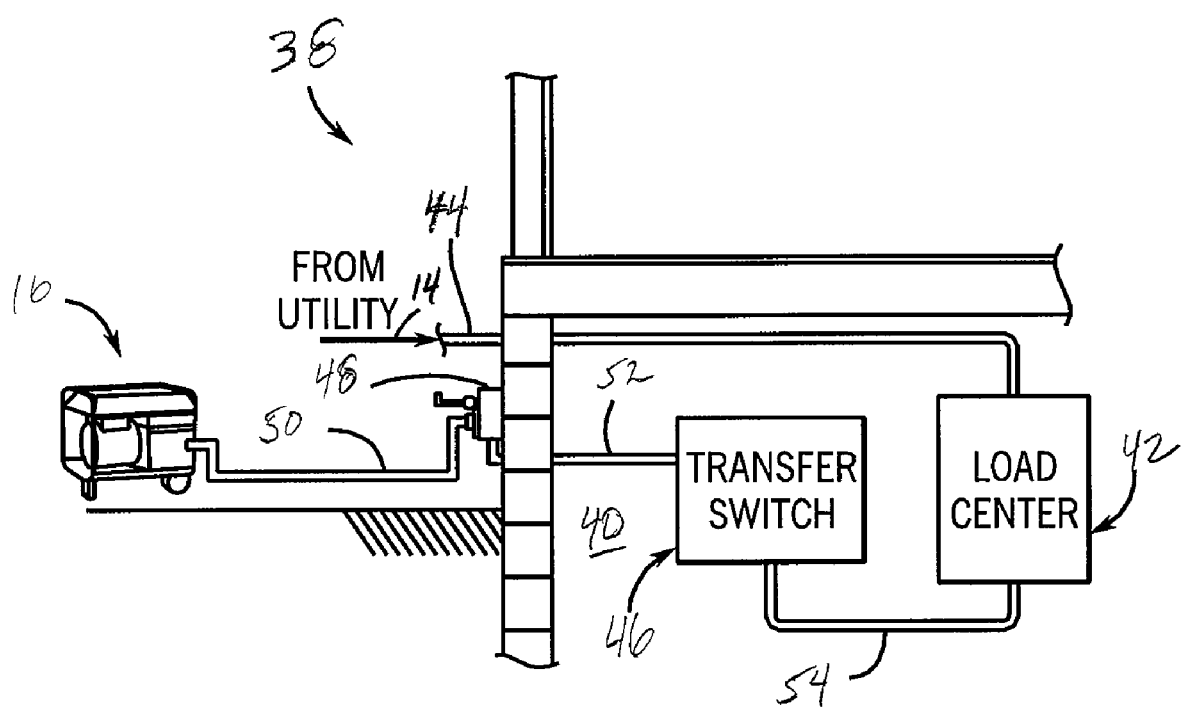
FIG. 3 is a schematic view illustrating the transfer switch arrangement of the present invention for interconnection between an auxiliary power source such as a generator and an electrical load center of a building.
Figure 4:
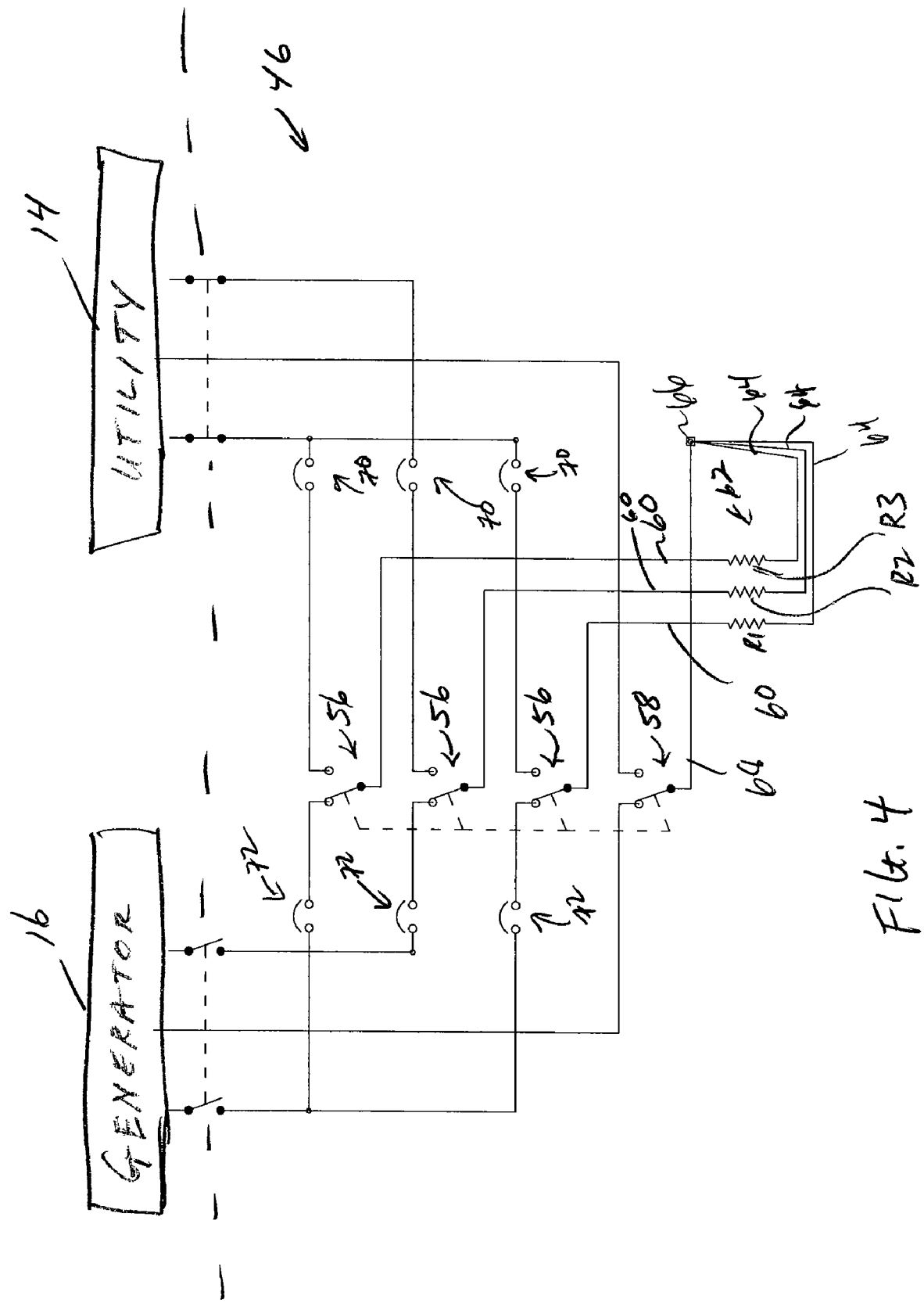
FIG. 4 is a simplified circuit diagram for a load-side, separately-derived transfer switch according to one embodiment of the present disclosure.

Referring now to FIG. 3, a building 38 includes an interior 40 within which a main electrical panel or load center 42 is located. In a known manner, electrical power from a primary power source 14, such as an electrical utility, is supplied to load center 42 via wiring contained within a conduit 44.

In order to supply power in the event of a disruption or discontinuation in the supply of power from the primary power source 14, load center 42 is interconnected with a transfer switch 46 in accordance with the invention, which is operable to control the supply of power to certain of the circuits contained within load center 42 from an auxiliary power source, such as a generator 20. In a representative installation, power from generator 16 is supplied to an exterior power inlet box 48 via a flexible cord 50. A conduit 52 extends between power inlet box 48 and transfer switch 46, and contains wiring for supplying auxiliary power to transfer switch 46. Generator 16 may be any satisfactory stand-alone or portable electrical power generator, as is known in the art. Power may be supplied from generator 16 to transfer switch 46 in a variety of ways as are known in the art, and the embodiment illustrated in FIG. 3 is presented simply for purposes of illustration.

Also in a known manner, certain of the branch circuits contained with load center 42 are interconnected with the individual switches of transfer switch 46 by means of wiring contained within a conduit 54.

In one embodiment, transfer switch 46 is a separately-derived, load-side transfer switch. Transfer switch 46, in the illustrated example, has three hot switches 56 and a single neutral switch 58. The hot switches 56 selectively connect the hot wires 60 of loads 62 (represented by resistors R1, R2, and R3) to the primary power source 14 when in a first contact position (normal operation) and connect the hot wires 60 of loads 62 to the auxiliary power source 16 when manually switched to a second contact position (auxiliary or emergency operation). In a preferred embodiment, the transfer switch 46 is a manual switch and therefore the connection of the loads 12 to the primary power source 14 or the auxiliary power source 16 is done manually by an operator.

Figure 2:
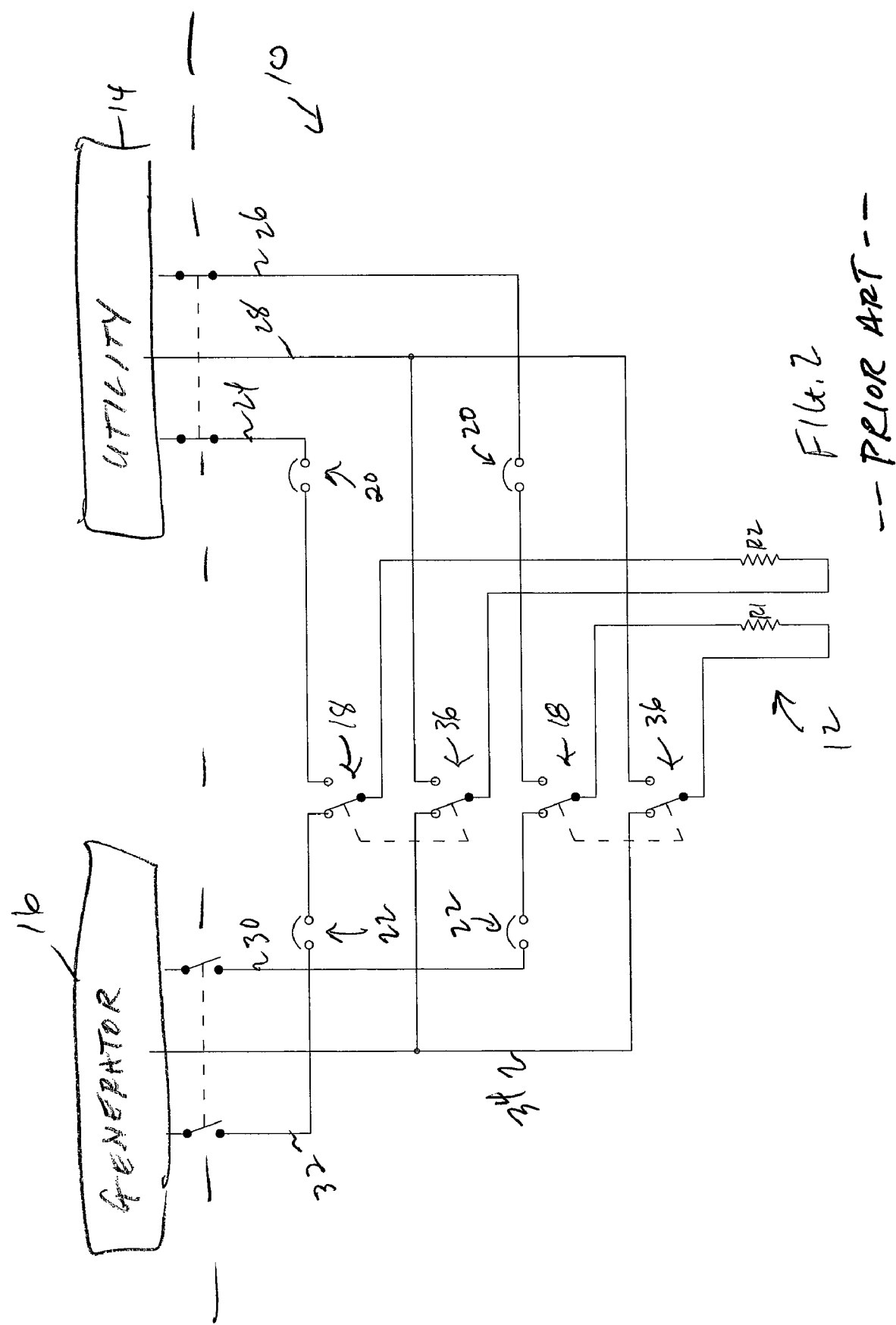
FIG. 2 is a simplified circuit diagram for a load-side, separately-derived transfer switch.

The neutral wires 64 of loads 62 are bonded together in a single connector 66. The single connector 66 has a single neutral wire 68 connected to neutral switch 58. This configuration allows for all of the neutral wires 64 to be selectively connected to the primary power source 14 or the auxiliary power source 16 through a single switch, e.g., neutral switch 58. Thus, the neutral wires 64 are switched as a single bundle of wires, rather than individual switched as done by the transfer switch illustrated in FIG. 2.

Connector 66 may be a bus, terminal block, wire connector, or similar device. Similar to hot switches 56, neutral switch 58 performs its switching after the utility breakers 70 on the utility side and after distribution breakers 72 on the generator side.

Figure 1:
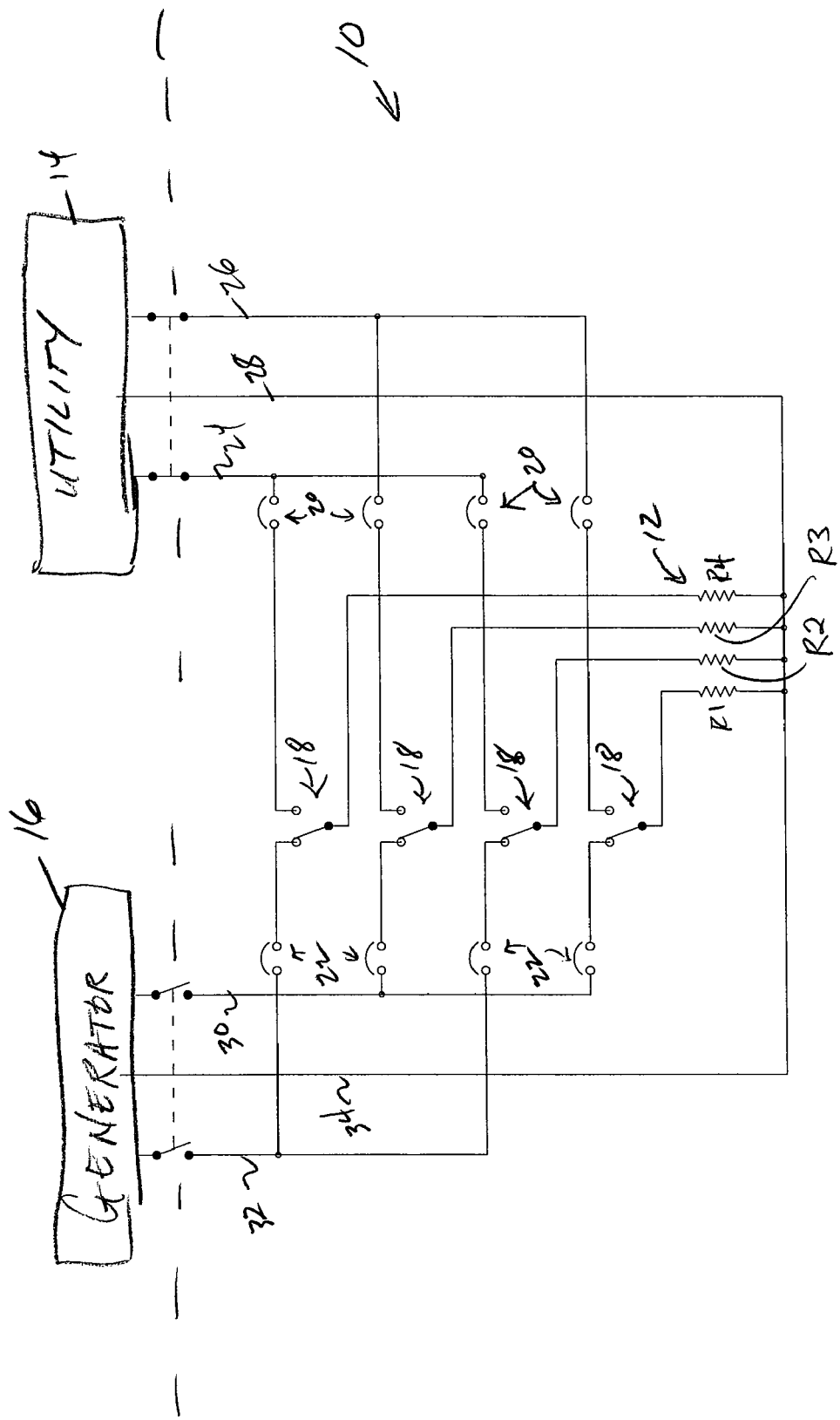
FIG. 1 is a simplified circuit diagram for a conventional load-side, non-separately-derived transfer switch.

For a transfer switch 46 having a total of four switches (3 hot switches and 1 neutral switch) the number of loads is reduced by one compared to the number of loads supported by a four-circuit, load-side, non-separately-derived transfer switch, such as that illustrated in FIG. 1. However, because the neutral wires 64 are bundled together in a single connector 66, only one neutral switch is required for multiple hot switches rather than a neutral switch for each hot switch as required by the transfer switch illustrated in FIG. 2.

Therefore, to provide a four-circuit, load-side, separately-derived transfer switch, a total of five switches would be needed; four hot switches and one neutral switch. The design embodied in the design illustrated in FIG. 2 would require 8 switches. So while the transfer switch 46 would need an additional switch operative as a neutral switch, the size, cost, and complexity of the transfer switch is far less than that required by a circuit incorporating neutral switches for each hot switch.

It is noted that since the neutral wires 64 are bound together, the hot switches 56 should be switched simultaneously rather than be individually operated to activate individual loads. However, to operate selected loads, breakers 70, 72 can be switched between conductive and non-conductive states to activate/deactivate a given load, i.e., connect/disconnect a load from the power sources.

While the present invention has been described to a manual transfer switch, it is recognized that the present invention may also be applicable to automatic transfer switches. Moreover, while a transfer switch has been described as having only one neutral switch connected to multiple neutral leads, it is recognized that that a transfer switch may be constructed to have multiple neutral switches, each of which is connected to multiple neutral leads. Moreover, as noted above, it is preferred that the hot switches be acted upon simultaneously. Accordingly, the transfer switch may be constructed to have a master switch with suitable linkage to throws each of the hot switches and the neutral switch simultaneously.

Various alternatives and embodiments are contemplated as being within the scope of the following claims particularly pointing out and distinctly claiming the subject matter regarded as the invention.

I claim:

1. A separately-derived, load-side transfer switch that selectively connects a plurality of loads to either a first power source or a second power source, each load having a hot lead and a neutral lead, the transfer switch comprising:
    a plurality of hot switches operative to selectively connect the hot leads of the plurality of loads to the first power source or the second power source;
    a neutral connector electrically connected to the neutral leads of the plurality of loads; and
    a neutral switch operative to selectively connect the neutral connector to the first power source or the second power source, wherein the neutral leads for the plurality of loads are connected to either the first power source or the second power source by operation of the neutral switch in a single switching operation.

2. The transfer switch of claim 1 wherein the neutral connector is a bus having a single input connected to the neutral switch and a plurality of outputs connected to the neutral leads.

3. The transfer switch of claim 1 wherein the first power source is a primary power source and the second power source is an auxiliary power source.

4. The transfer switch of claim 3 wherein the primary power source is a utility power source and the auxiliary power source is an electric generator.

5. The transfer switch of claim 1 wherein the hot switches and the neutral switches are manually operated.

6. A separately-derived, load-side transfer switch that selectively connects N loads to either a primary power source or an auxiliary power source, each load having a hot lead and a neutral lead, the transfer switch comprising less than 2N switches connected to the N loads to selectively connect the N neutral leads and N hot leads to either the primary power source or the auxiliary power source, wherein N is greater than one.

7. The transfer switch of claim 6 wherein the less than 2N switches are N+1 switches.

8. The transfer switch of claim 7 wherein the N+1 switches includes:

N hot switches, each connected to the hot lead of a load; and 1 neutral switch connected to the neutral leads for all the loads.

9. The transfer switch of claim 8 further comprising a bus connected to the neutral switch on an input side and connected to the neutral leads for all loads on an output side.

10. The transfer switch of claim 6 wherein the auxiliary power source is an electric generator.

11. The transfer switch of claim 6 wherein the less than 2N switches are manually operated.

12. A method of connecting loads selectively between a primary power source and an auxiliary power source, wherein each load includes a hot lead and a neutral lead, the method comprising:

connecting the neutral leads for the loads to a neutral switch, wherein in a first contact position the neutral switch connects the neutral leads to a primary power source and in a second contact position connects the neutral leads to an auxiliary power source; and moving the neutral switch to a desired contact position to simultaneously connect the neutral leads to one of the primary power source or the auxiliary power source.

13. The method of claim 12 wherein connecting includes tying the neutral leads together in a single connector interposed between the single switch and the loads.

14. The method of claim 12 wherein each hot lead is connected to a hot switch, each hot switch designed to connect a hot lead to the primary power source when in a first contact position and to the auxiliary power source when in a second contact position, and further comprising individually moving the hot switches to a desired contact position to connect the hot leads to one of the primary power source or the auxiliary power source.

15. The method of claim 14 wherein moving the neutral switch and the hot switch to their desired contact positions is done manually.

* * * * *